Feb. 24, 1970  B. ULRICHSEN ET AL  3,496,805
METHOD FOR CONTROLLED REVERSE MOVEMENT OF TOOLHOLDERS
ALONG AN ARBITRARY PATH IN MACHINING TOOLS
Filed Nov. 24, 1967

BØRRE ULRICHSEN &
TORBJØRN BRATAAS
INVENTORS

BY
ATTORNEY

United States Patent Office 3,496,805
Patented Feb. 24, 1970

3,496,805
METHOD FOR CONTROLLED REVERSE MOVEMENT OF TOOLHOLDERS ALONG AN ARBITRARY PATH IN MACHINING TOOLS
Börre Ulrichsen and Torbjörn Brataas, Kongsberg, Norway, assignors to Kongsberg Vapenfabrikk, Kongsberg, Norway, an organization of Norway
Filed Nov. 24, 1967, Ser. No. 685,632
Claims priority, application Norway, Nov. 29, 1966, 165,783
Int. Cl. B23b 35/00
U.S. Cl. 77—1    6 Claims

ABSTRACT OF THE DISCLOSURE

A toolholder with a tool is returned from an arbitrary point within the contour element, along or parallel to the path of the element to its starting point, further return movement taking place based on auxiliary data which define the region of the path the tool is to follow during the return movement.

---

At tool breakage or other non-predicted interruption in the automatic machining cycle of machine tools which are numerically controlled (NC) by pre-programmed data sets representing elements of the contour of the workpiece, it is necessary to return the toolholder with its tool to a suitable reference point (fixed point in relation to the machine tool), and the object of the present invention is to arrive at a method for automatic return movement of a toolholder along an arbitrarily chosen path, and new forward movement of the toolholder. It is assumed that said reference point corresponds with the location where replacement of the tool should preferably take place. First of all the invention relates to return movement of a broken tool which is used for internal machining of workpieces, i.e. in such cases in which the location of the broken tool cannot be observed by the operator.

One further condition for pulling back a tool, for example at internal machining, is that the path of the tool during the withdrawal is automatically controlled to avoid collision between the broken tool or the toolholder on one side and the workpiece on the other side.

According to the invention the toolholder with tool is moved back from an arbitrary point within the contour element in question along or parallel with the path of said element to its starting point, and the further return movement takes place by two-way reading-in of auxiliary data sets defining the sections of the path which the tool is to follow during the return movement from said starting point to the point where said return movement is to stop, and a new forward movement to the point in which the return movement was started, takes place as during normal operation of the machine tool during ordinary working, in case with forced speed, or along the return path.

In this way is obtained full safety that the parts of the contour of the workpiece already prepared cannot be damaged when a broken tool is brought back to the reference point for replacement.

The return movement along or parallel with the path of the first mentioned element may either be controlled by the data set of the contour element in question by said set being driven in backward direction, or by means of a data set which is prepared during the forward movement. Consequently, said latter data set will not be used unless within the contour element in question a breakage of the tool should occur, or for some other reason it should be desirable to withdraw the tool, such as for inspection.

Figure 1:
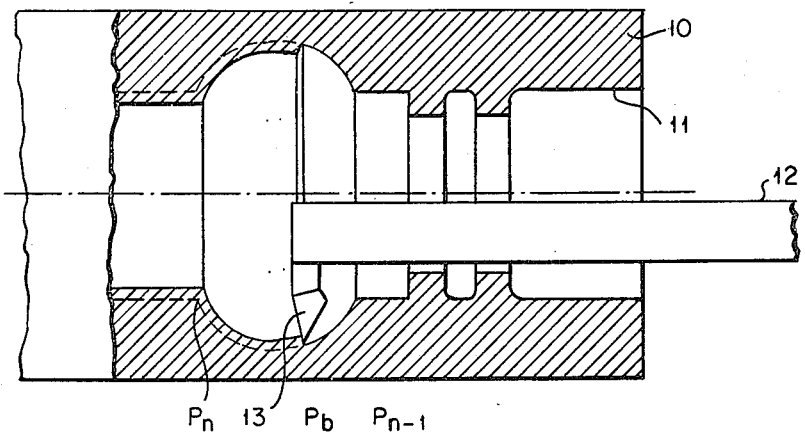
Figure 2:
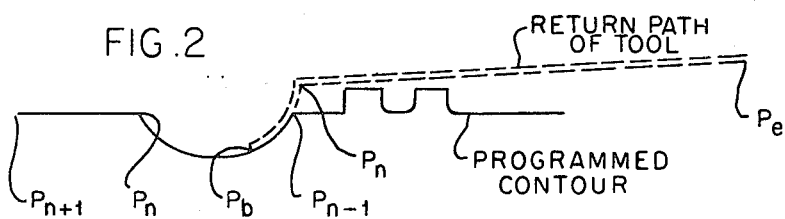
Figure 3:
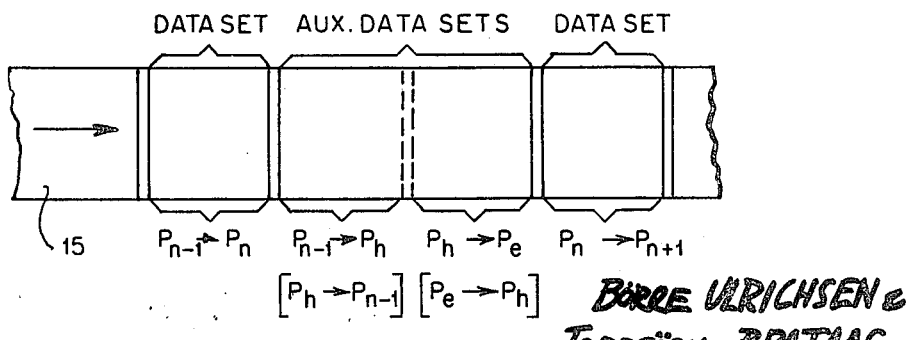

The invention is to be described in detail with reference to the drawing in which—
FIG. 1 shows a longitudinal section of an arbitrarily chosen workpiece which is machined internally,
FIG. 2 shows the inner contour of a workpiece after machining, and
FIG. 3 shows a part of a control strip, for instance, a punched strip, having auxiliary data sets for controlled return movement of the tool in addition to the ordinary data sets for controlling the machining.

A typical workpiece is shown at 10 in longitudinal section in FIG. 1, according to which the workpiece 10 is to be machined internally along an arbitrary contour 11 consisting of a number of contour elements which may be straight lines or circular or parabolic arches. In the embodiment shown, the contour element $P_{n-1} \to P_n$ is worked on, and it is assumed that the tool 13 breaks in point $P_b$, and that consequently, the tool with a toolholder 12 is to be withdrawn from the workpiece. How this takes place will be explained with reference to FIG. 2 showing the same contour as FIG. 1, and the path which the tool is to follow during return movement and new forward movement. In FIG. 2 the points $P_{n+1} \to P_n$ and $P_{n-1}$ representing reading-in points for a path control system, as well as the transitions, such as $P_n$, from one contour or path element $P_{n-1} \to P_n$ to the next contour element $P_n \to P_{n+1}$.

FIG. 2 also shows a reference point $P_e$ which may be the point at which the tool is adjusted and in case inspected and/or replaced. Said reference point is located outside the workpiece.

The above mentioned contour elements have been preprogrammed on an information carrier 15, such as shown in FIG. 3. Thus, the first data set shown on the left side represents the circle arch shaped contour element between the point $P_{n-1}$ and $P_n$, which data set, according to the invention, is followed by one or more auxiliary data sets which are used only if a tool breakage should occur during the machining of the workpiece along the contour $P_{n-1} \to P_n$, i.e., the contour element represented by the data set just mentioned. It is assumed that such breakage occurs and that the point in question is $P_b$. According to the invention the tool is returned from said Point $P_b$ back to $P_{n-1}$ along or parallel with the contour element $P_b$ to $P_{n-1}$, either thereby that the information carrier is moved back for controlling the tool by said data set, or thereby that during the forward movement along the contour element $P_{n-1}$ to $P_n$ there is automatically prepared or registered a data set which is to be used only if the forward movement along said contour element must be interrupted and the tool withdrawn. From the starting point $P_{n-1}$ the return movement of the tool is controlled by the auxiliary data sets shown in the middle of the strip in FIG. 3 and which represent the paths $P_{n-}$ to $P_h$ and $P_h$ to $P_e$, point $P_h$ being the point in which the direction of return movement is changed.

When the tool arrives at the end point $P_n$ of the contour element in question, such data set registered during the forward movement may be erased provided the registering takes place on a magnetic information carrier.

When the tool has been brought back to the reference point $P_e$ the broken tool is replaced by a new one. As soon as this has taken place the tool is brought back controlled by the same auxiliary data sets, such as by the information carrier being driven in backward direction, which controlled forward movement may take place with forced speed. From the starting point $P_{n-1}$ to the point $P_b$ at which the breakage takes place, the control may be taken over by the original data set, in case also with forced speed, until $P_b$ is reached, from which the control occurs in the ordinary way.

As appears, for each data set for normal machining there is also programmed one or more auxiliary data sets representing the return path from the data point to the reference point and back to the same data point which registering of auxiliary data sets may either be made in advance to cover the posible places of breakage, or during the normal machining. Consequently, such auxiliary data sets are not normally read-in, only when the operator switches over his control equipment to position "tool breakage." It is also possible to avoid the auxiliary data sets from the information carrier controlling the ordinary movements, and instead of that make use of an auxiliary information carrier which is moved parallelly with the normal information carrier and used only if fault should occur in the form of a tool breakage or the like. Besides, the auxiliary data sets may be omitted from the information carrier in such cases in which the possibilities for return movements are not regarded decisive, especially where the possibility exists that the operator may visually observe the tool during return movements.

We claim:

1. Method for controlled reverse movement of toolholders along an arbitrary path in machining tools which are numerically controlled by pre-programmed data sets representing elements of the contour of the workpiece, characterized in that the toolholder with tool is returned from an arbitrary point ($P_b$) within the contour element ($P_{n-1} \rightarrow P_n$) along or parallel with the path of said element to its starting point, that the further return movement takes place at two-way reading-in of auxiliary data sets which define the sections of the path which the tool is to follow during the return movement from said starting point to the point at which the return movement is to stop, and that new forward movement to the point at which the return movement was started takes place as during normal operation of the machine tool, in case with forced speed, or along the return path.

2. Method as claimed in claim 1, characterized in that said further return movement takes place during reading-in of auxiliary data sets in addition to the data sets for normal movement, said auxiliary data sets being not normally read-in for carrying out the movement unless not being interfered manually to interrupt the automatic cycle and the return movement being in case started.

3. Method claimed in claim 1, characterized in that said return movement along or parallel with the path of the first mentioned contour element ($P_{n-1} \rightarrow P_n$) is controlled by the data set of the same contour element by said data set being moved back.

4. Method as claimed in claim 1, characterized in that said return movement along or parallel with the path of the first mentioned contour element ($P_{n-1} \rightarrow P_n$) is controlled by a data set registered during the forward movement.

5. Method as claimed in claim 2, characterized in that the said auxiliary data sets are especially identified so that they may be distinguished from the data sets defining the normal machining movement.

6. Method as claimed in claim 5, characterized in that said auxiliary data sets may be read-in before or after the data set within which the return movement may start.

References Cited

UNITED STATES PATENTS 3,319,340  5/1967  Graham _____ 90—13

GERALD A. DOST, Primary Examiner